(12) United States Patent
Stull

(10) Patent No.: US 6,957,837 B2
(45) Date of Patent: Oct. 25, 2005

(54) AUTOMOTIVE GRILLE

(76) Inventor: William S. Stull, 1315 W. Flint St., Lake Elsinore, CA (US) 92530-3250

( * ) Notice: Subject to any disclaimer, the term of this patent is extended or adjusted under 35 U.S.C. 154(b) by 0 days.

(21) Appl. No.: 10/797,908

(22) Filed: Mar. 9, 2004

(65) Prior Publication Data

US 2005/0023863 A1 Feb. 3, 2005

Related U.S. Application Data

(63) Continuation-in-part of application No. 10/287,321, filed on Nov. 2, 2002, now Pat. No. 6,702,343.

(51) Int. Cl.[7] .............................................. B62D 25/08
(52) U.S. Cl. ....................... 293/115; 180/68.6; 427/258
(58) Field of Search ........................ 293/115; 180/68.6; 427/258

(56) References Cited

U.S. PATENT DOCUMENTS

| 3,152,950 A | 10/1964 | Palmquist et al. |
| 4,351,864 A | 9/1982 | Giannakidis |
| 4,403,004 A | 9/1983 | Parker et al. |
| 5,487,575 A | 1/1996 | Chase |
| 5,695,228 A | 12/1997 | Storer |
| 6,027,150 A | 2/2000 | Flewitt et al. |
| 6,206,438 B1 | 3/2001 | Pueyo |

OTHER PUBLICATIONS

Catalog, STULL Industries, Inc. Custom Truck and Automotive Accessories, Catalog 2001.

Primary Examiner—Joseph D Pape
(74) Attorney, Agent, or Firm—Knobbe, Martens, Olson & Bear, LLP.

(57) ABSTRACT

An improved automotive grille and an improved method of making the automotive grille are provided. The automotive grille includes durable leading edge portions that are secured to decorative portions of the grille using a complimentary guide and channel approach. This manner of construction improves the durability and environmental tolerance of the grille components while at the same time improving the decorative appearance of the grille.

29 Claims, 11 Drawing Sheets

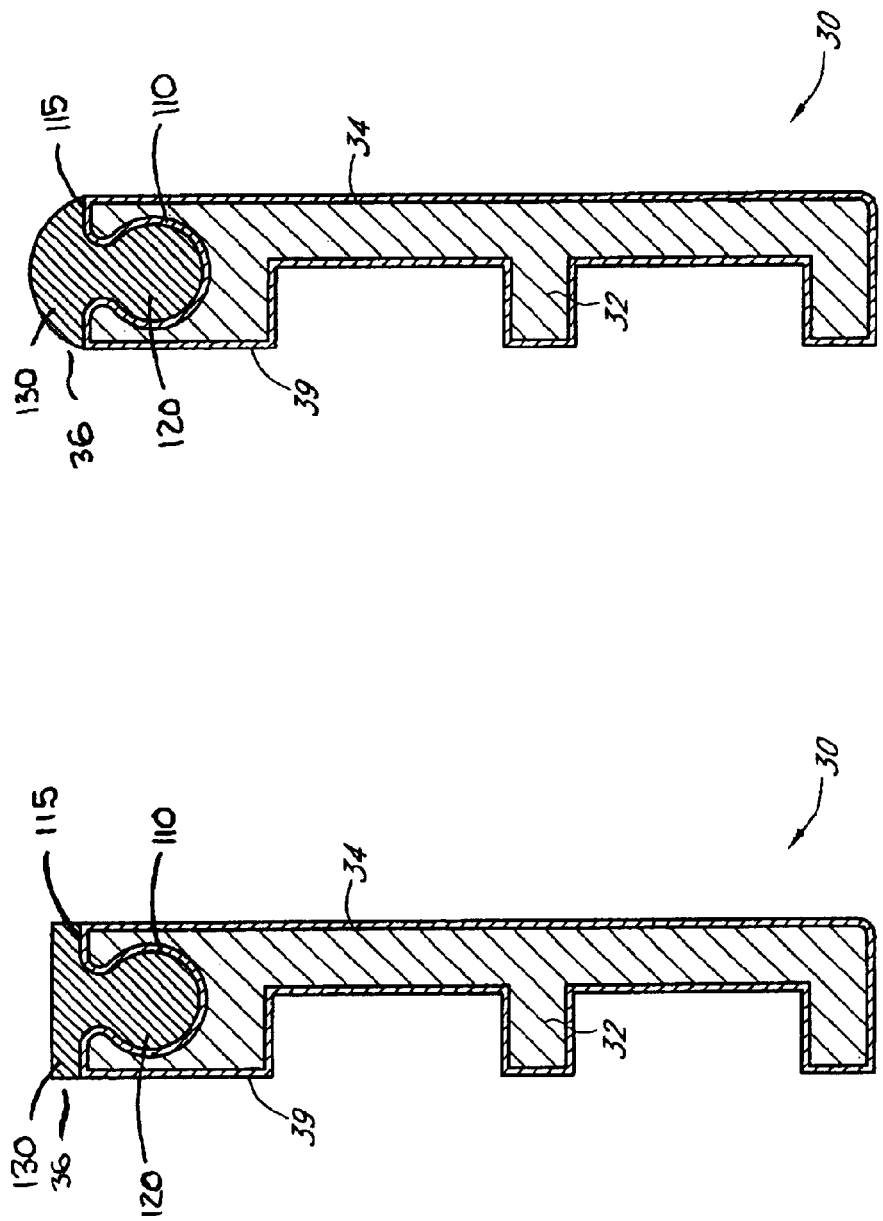

AUTOMOTIVE GRILLE

PRIORITY CLAIM

This application is a continuation-in-part and claims the benefit of priority of U.S. patent application Ser. No. 10/287,321 filed Nov. 2, 2002, now U.S. Pat. No. 6,702,343 which is hereby incorporated by reference in its entirety.

BACKGROUND OF THE INVENTION

1. Field of the Invention

The preferred embodiments of the present invention relate to automotive grilles.

2. Description of the Related Art

Automotive grilles are used as a barrier to protect an automobile's radiator as well as serve as a decorative feature. The grille generally serves as a source of ventilation to the radiator. The grille also provides decorative features which improve the look and style of an automobile.

The grilles protect the radiator from a number of objects, such as bugs, rocks, and road debris, which may damage the radiator and the grille. The grilles are often pitted or dented by the impact of these objects, resulting in an undesirable decorative finish. Furthermore, the grilles may be subject to significant impact forces during collisions. Moreover, certain materials and methods of making the grille result in rusting of various parts of the grille or flaking off of coating materials. Rusting adversely affects the decorative finish of the grill and contributes to decreased strength over an extended period of time. Flaking off of the powder coating also reduces the quality of the decorative finish of the grille, and provides no barrier to the grille base material.

Various conventional grille designs incorporate a decorative leading edge. To achieve the decorative appearance of the leading edge, a powder coating, or other similar coating may be applied to the entire grille, and the leading edge of the grille may be polished thereby removing the powder coating on the leading edge to obtain the decorative finish. Other automotive grilles are fabricated from a high-impact plastic and then coated with a metallic coating, such as chrome plating.

There are several problems associated with the aforementioned techniques for obtaining a decorative finish arising, in part, from polishing the grille after powder coating and applying a metallic coating. For example, the aluminum may become tarnished, and moisture can get beneath the powder coating at the edges, resulting in flaking off of the powder coating or metallic coating and rusting. Additionally, it may be desirable to fabricate the leading edge out of a relatively durable material designed to retain its decorative appearance, however, difficulties may arise in securing the leading edge to other grille components.

Accordingly, an improved automotive grille is required having the decorative features of a conventional grille, but also overcoming the problems associated with conventional manufacturing techniques.

SUMMARY OF THE INVENTION

The aforementioned needs are satisfied by the automotive grill assembly of the present invention which, in one aspect, comprises a substrate having a first and second side and dimensions adapted to be mounted to the front of a vehicle, wherein the substrate includes a plurality of decorative members defining a plurality of exposed surfaces and a plurality of front faces having at least one channel formed therein positioned adjacent the first side of the substrate wherein the exposed surfaces and the front faces are substantially coated with a coating material to inhibit oxidation of the substrate; a plurality of mounting structures attached to the substrate on a second side opposite the first side, wherein the plurality of mounting structures are adapted to secure the substrate to the vehicle; and at least one decorative weather resistant member having at least one guide complementarily dimensioned to the at least one channel formed in the front faces of the plurality of decorative members of the substrate wherein the at least one decorative weather resistant member is secured to the at least one front face to substantially cover the at least one front face to further inhibit oxidation of the at least one front face of the substrate.

In one implementation, an automotive grille is disclosed comprising: a substrate having a first and second side and dimensions adapted to be mounted to the front of a vehicle, wherein the substrate includes a plurality of decorative members defining a plurality of exposed surfaces and a plurality of front faces having at least one guide formed therein positioned adjacent the first side of the substrate wherein the exposed surfaces and the front faces are substantially coated with a coating material to inhibit oxidation of the substrate; a plurality of mounting structures attached to the substrate on a second side opposite the first side, wherein the plurality of mounting structures are adapted to secure the substrate to the vehicle; and at least one decorative weather resistant member having at least one channel complementarily dimensioned to the at least one guide formed in the front faces of the plurality of decorative members of the substrate wherein the at least one decorative weather resistant member is secured to the at least one front face by joining of the guide within the channel to substantially cover the at least one front face to further inhibit oxidation of the at least one front face of the substrate.

In another aspect, a method is disclosed for forming an automotive grill comprising: Forming a substrate having a first and a second side and dimensions adapted to be mounted to the front of a vehicle, wherein the substrate includes a plurality of decorative members defining a plurality of exposed surfaces and a plurality of front faces having at least one guide formed therein positioned adjacent the first side of the substrate; Attaching a plurality of mounting structures to the substrate on a second side opposite the first side, wherein the plurality of mounting structures are adapted to secure the substrate to the vehicle; Coating the exposed surfaces of the substrate, decorative members, and mounting structures with a coating material to inhibit oxidation of the substrate; and Securing a plurality of decorative weather resistant members, having at least one channel dimensioned to complementarily match the at least one guide formed within the plurality of front faces of the plurality of decorative members of the substrate, to the plurality of front faces to substantially cover the plurality of front faces to further inhibit oxidation of the plurality of faces of the substrate.

In still another aspect, an automobile grill is disclosed comprising: a substrate defining a front face having a channel formed therein and a body; a protective coating substantially the entire substrate including the front face such that the protective coating coats the interface between the front face of the substrate and the body of the substrate substantially continuously; and a decorative protective member having at least one guide formed thereon that secures to the front face by complimentary attachment of the at least one guide to the at least one channel such that the decorative protective member is secured to the substrate so that the protective coating is not substantially removed from the substrate to accommodate the decorative protective member.

The grill assembly of the present invention provides an assembly that is less likely to tarnish over time and is more resistant to damage or flaking of coatings on the substrate. These and other objects and advantages of the present invention will become more apparent from the following description taken in conjunction with the accompanying drawings.

BRIEF DESCRIPTION OF THE DRAWINGS

FIGS. 13A–D are detailed cross sectional views of the automotive grille showing the channel securing assembly of FIG. 12.

DETAILED DESCRIPTION OF THE PREFERRED EMBODIMENT

Certain preferred embodiments of the present invention described herein provide for an automotive grille and a method of making the automotive grille.

Figure 1:
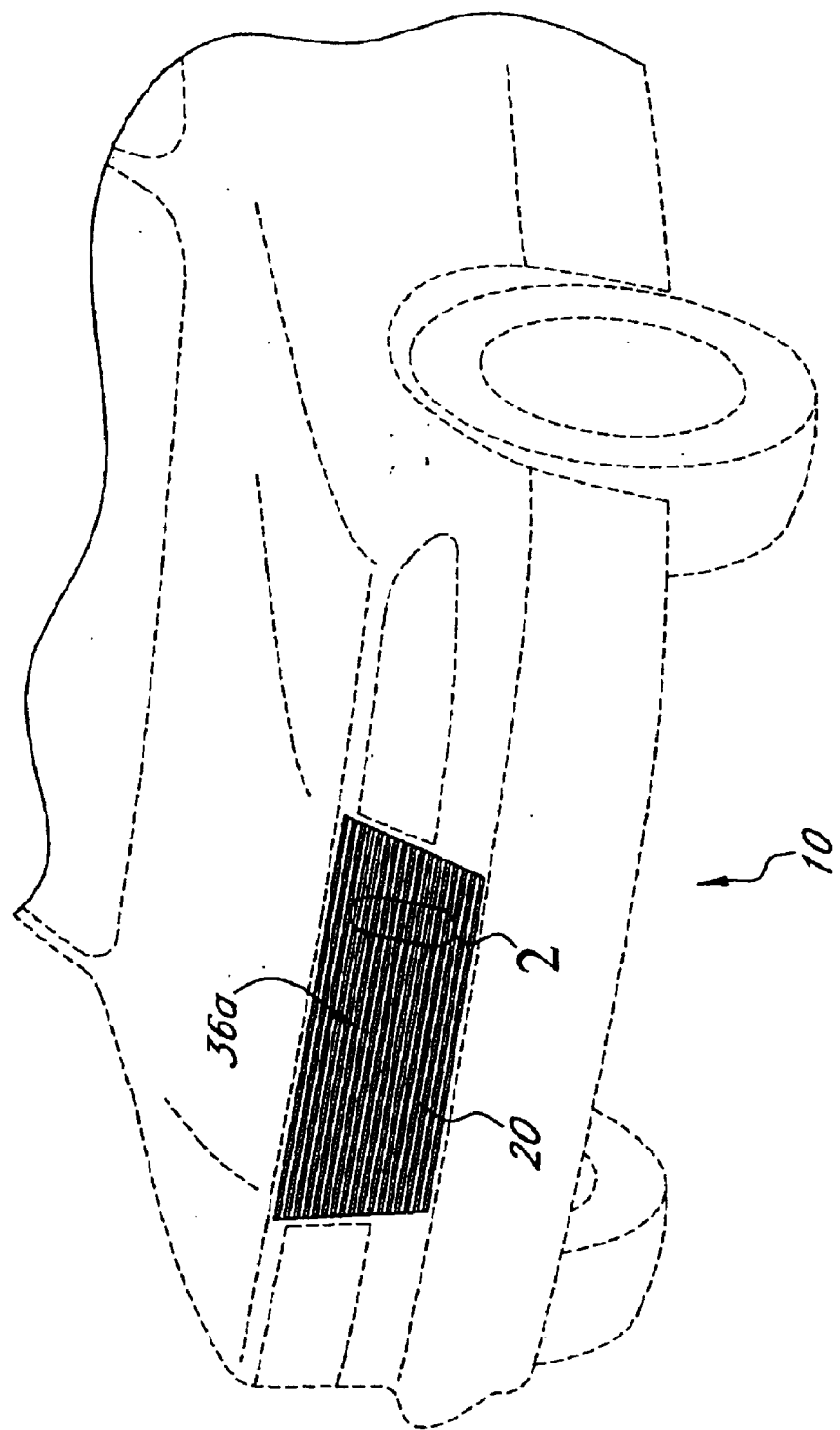
FIG. 1 is a perspective view of an automotive grille positioned at the front end of an automobile in accordance with a preferred embodiment of the present invention.

With reference to FIG. 1, the front end of an automobile 10 is shown having a decorative automotive grille 20 positioned therein. The grille is mounted to the forward edge of an engine hood, and may be suspended over a front bumper. The grille is preferably mounted to be flush with its surrounding automobile body panel structure, such that the bumper, hood and grille are aligned as shown in FIG. 1. It is envisioned that the grille may be used with any automobile or automobile body panel structure adapted to receive an automotive grille.

The grille 20 has an exterior or front surface 36, visible from the front end of the automobile. The front surface defines the decorative surface of the grille. The grille also has an oppositely disposed interior or rear surface which faces the engine compartment of the automobile.

Figure 2:
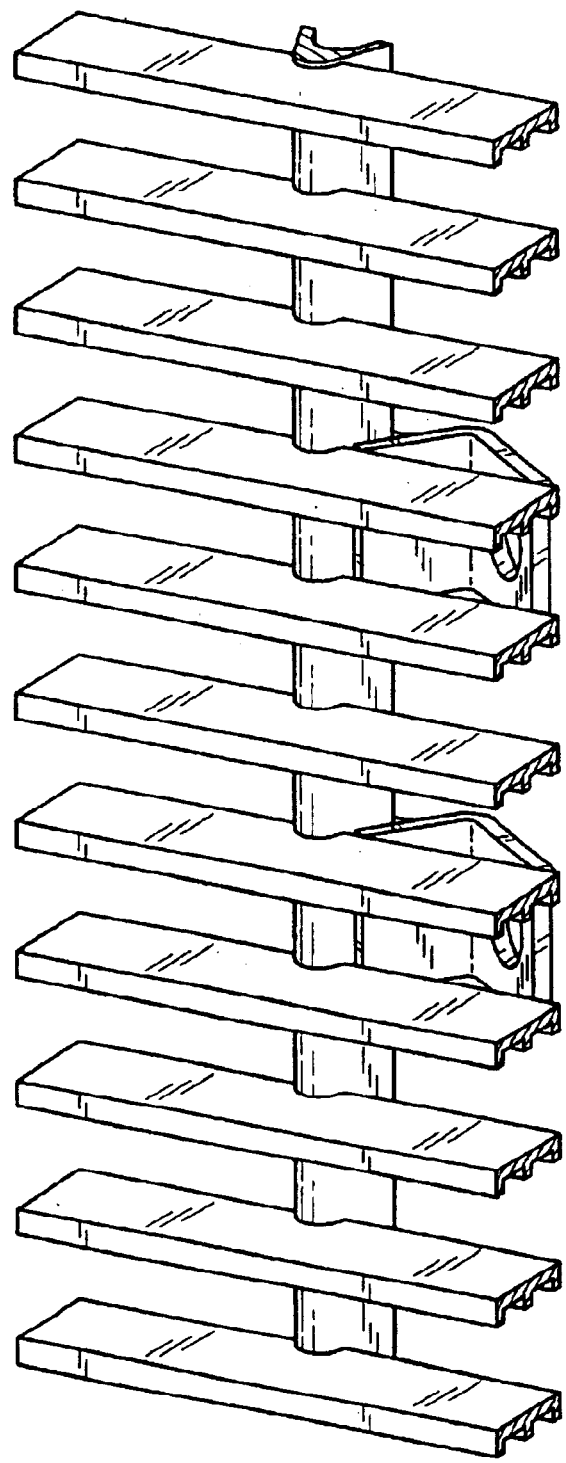
FIG. 2 is a perspective view of a cutaway section of the automotive grille of FIG. 1.
Figure 4:
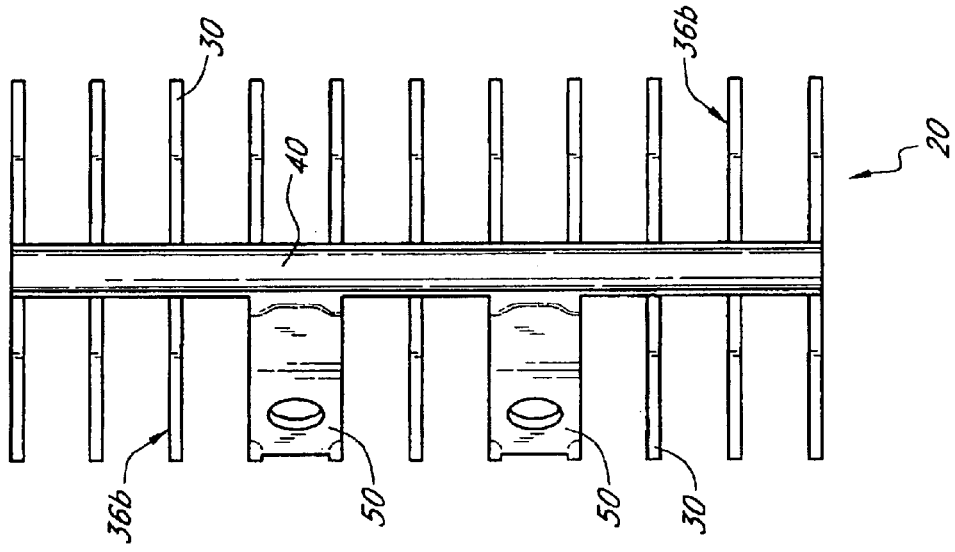
FIG. 4 is a back view of a cutaway section of the automotive grille of FIG. 1.
Figure 3:
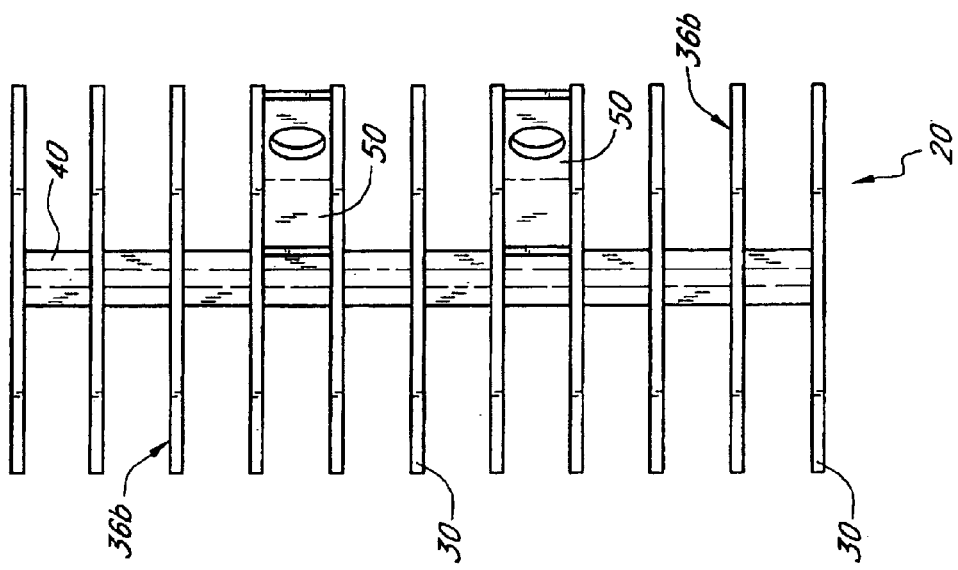
FIG. 3 is a front view of a cutaway section of the automotive grille of FIG. 1.
Figure 5:
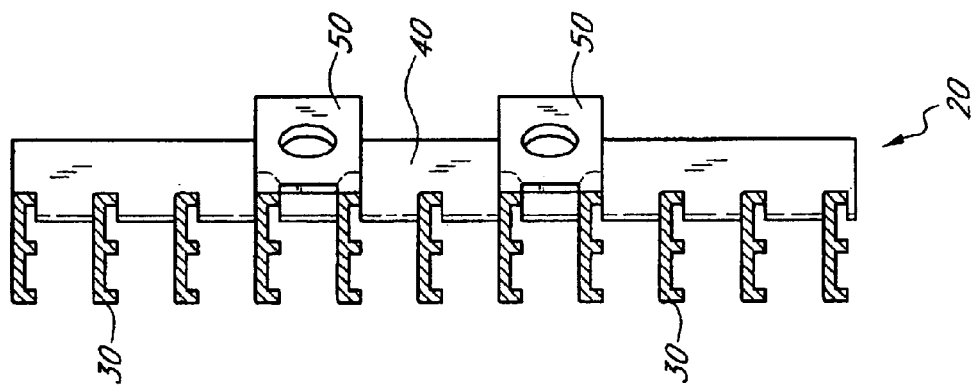
FIG. 5 is a side view of a cutaway section of the automotive grille of FIG. 1.

A cut-away section of the grille is shown in FIGS. 2–8 to better show the features of the grille 20. As shown in FIGS. 2–5, the cutaway section is shown from a variety of angles: FIG. 2 is a perspective view, FIG. 3 is a front view, FIG. 4 is a back view, and FIG. 5 is a side view. As can be seen from these views, vehicle grille has a structure having a first and second side defining the front and rear surfaces.

The structure includes a plurality of horizontally extending slats which form the decorative members 30 of the grille. The decorative members 30 include a plurality of exposed surfaces and a plurality of front faces adjacent the first side of the structure.

Figure 6:
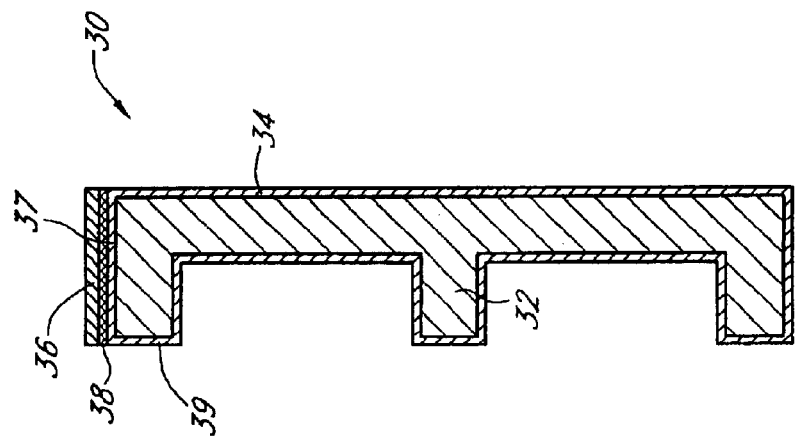
FIG. 6 is a detailed cross sectional view of the automotive grille of FIG. 4 showing the substrate having square edges.
Figure 8:
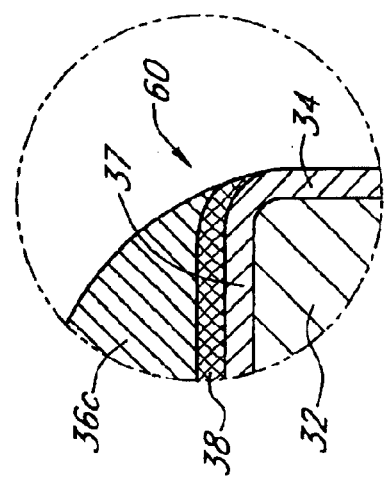
FIG. 8 is a detailed cross sectional view of the automotive grille of FIG. 7.
Figure 7:
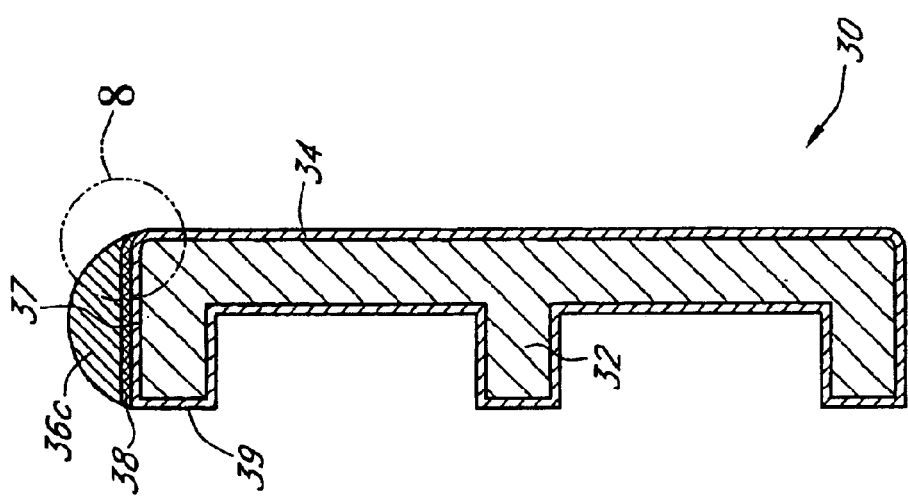
FIG. 7 is a detailed cross sectional view of the automotive grille of FIG. 4 showing the substrate having rounded edges.

The decorative members 30 are shown in detail in FIGS. 6–8. FIG. 6 shows a detailed cross-sectional view of a decorative member 30 having square edges in accordance with a preferred embodiment of the present invention. FIG. 7 shows a detailed cross-sectional view of a decorative member 30 having rounded edges in accordance with another preferred embodiment. FIG. 8 is a detailed view showing rounded edge 60. The rounded edges of the substrate at the decorative members also reduce the problem of the powder coating flaking off by reducing stress points, thereby ensuring the superior decorative finish of the automotive grille of the preferred embodiments of the present invention.

With reference back to FIGS. 2–5, the grille structure also preferably includes at least one elongate support 40 which extends vertically to connect the horizontally extending decorative members and to provide support for the grille structure 20. The elongate support member 40 provides rigidity to the grille structure 20, thereby improving the strength of the automotive grille.

The grille includes at least an upper and lower mounting member 50 configured to be attached to the automobile with at least an upper and lower support fastener. Mounting member 50 is shown as a plurality of brackets adapted to be secured to the frame of the automobile. Any suitable mounting member or fastener may be used, though consideration must be given for the requirement that the grille 20 be structurally resistant to wind and vibrational forces generated when the automobile is in motion.

The decorative members 30, support member 40, and mounting members 50 are preferably integrally joined to form structure 20. The decorative members, elongate members, and support members are preferably welded together. Alternatively, the members may be molded to form structure 20.

The material of the structure is preferably metallic, and more preferably aluminum. It is envisioned that other materials as known to those skill in the art may be used such as other metals, high impact plastics and other similar materials may be used with the preferred embodiments of the present invention. The material should provide adequate strength to withstand impact without fracturing of the grille.

The exposed surfaces 36, including the exposed surfaces of the decorative members 40, the elongate member 40, and the support members 50 are preferably covered with a protective coating material 34, which can be a powder coating 34. The powder coating 34 may be a black satin powder coating. See FIGS. 6 and 7. Alternatively, any of a number of other coating materials can be used as the protective coating material 34. For example, a wet paint can be applied or the substrate 30 can be anodized without departing from the spirit of the present invention. Preferably, the protective coating 34 uniformly coats the outer surface of the substrate 30 including the front face 37 thereof to inhibit rusting or oxidation of the substrate. As shown in FIG. 8, the interface between the front face 37 and an adjacent side face 39 is more uniformly covered by the protective coating 34 than if the front face 34 was polished and exposed. Hence, the tendency of the protective coating to flake off is reduced as there is fewer exposed areas where contaminants can oxidize the substrate 30 thereby causing the flaking of the protective layer.

A plurality of decorative resistant members 36, dimensioned to match the front faces of the decorative members 30, are adhered to the front faces 37 of the decorative members 30 to substantially cover the front faces 37 to further inhibit oxidation of front faces 37 of the structure. In an alternative embodiment, at least one decorative resistant member 36 is adhered to the decorative members 30. The decorative resistant members 36 are preferably stainless steel, which is less prone to tarnishing. It is envisioned that other metallic materials that do not tarnish easily and have a desirable appearance for an extended period of time may be used with the preferred embodiments of the present invention. The decorative resistant members 36 are thin compared to the decorative member base 32, and preferably have a thickness of about 26 gauge when using stainless steel. The decorative resistant members 36 are preferably rolled on to the front face of the decorative members of the structure, and adhered to the front faces using a glue 38. The glue 38 is preferably an epoxy, and more preferably a liquid resin epoxy, such as Scotch Weld Part No. DP-190, available from 3M of Minneapolis, Minn. By adhering the decorative weather resistant members 36, which provide the improved decorative finish of the grille, the coating material 34 is not removed. Since the coating material 34 is not removed, there are less exposed surfaces at which moisture can get beneath the coating, thereby reducing the risk of flaking off of the coating material or rusting.

Figure 10:
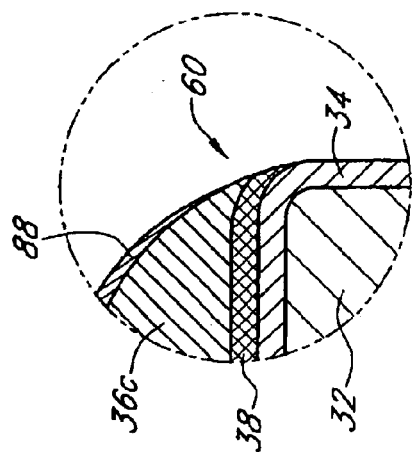
FIG. 10 is a detailed cross sectional view of the automotive grill of FIG. 9.
Figure 9:
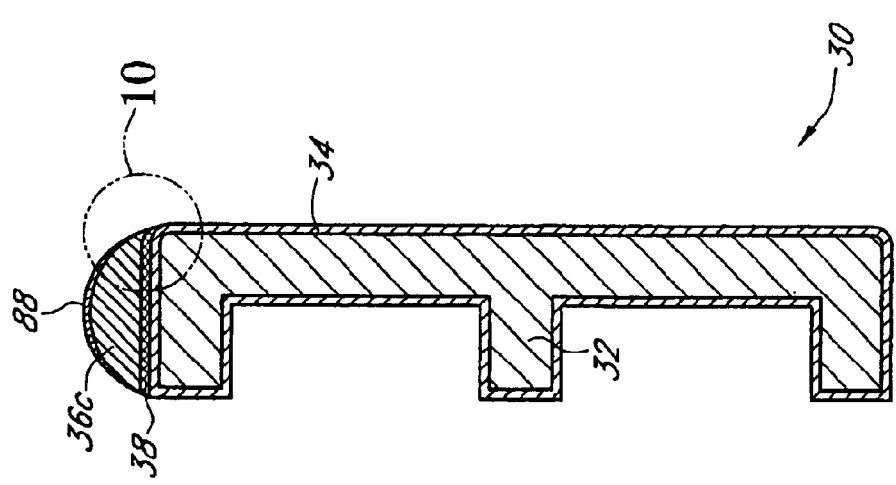
FIG. 9 is a detailed cross sectional view of the automotive grill of FIG. 7 showing an additional coating positioned on the substrate.

FIGS. 9 and 10 illustrate a second embodiment of the present invention. In this embodiment, the resistive members 36 are coated with a decorative coating 88 such as chrome plating. In one particular example, the resistive member 36 is comprised of a poly stainless steel and is chrome plated. The chrome plating 88 can also be extended to cover the entire substrate 20 to provide a chrome appearance.

In this implementation, the resistive members 36 do not have to be made of stainless steel but can be made of any of a number of other materials that have sufficient rigidity such that damage to the decorative members is reduced. Again, the coating interposed between the resistive members 36 and the substrate 30 is inhibited from flaking off in the manner described above.

Figure 11:
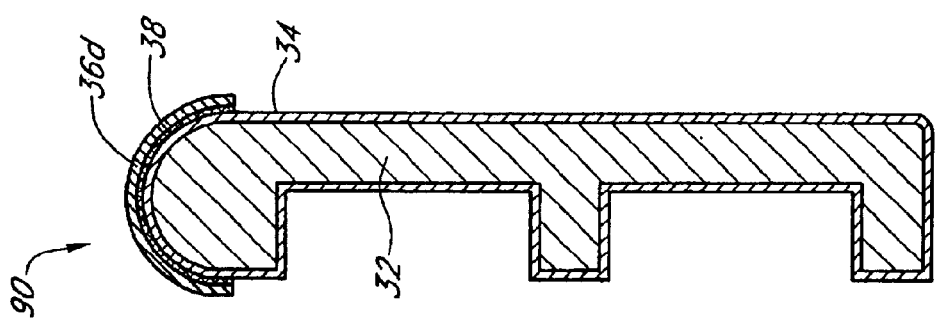
FIG. 11 is a detailed cross-sectional view of an automotive grill showing an alternative configuration.

FIG. 11 illustrates yet another example wherein the substrate 32 has a rounded front end 90 which includes the protective coating 34, such as a powder coating or other coatings as described above. The protective element 36 can be a thin layer of protective decorative material such as stainless steel that is shaped or otherwise contoured to match the contour of the rounded front end 90. A layer of adhesive 38 can then be used to adhere the decorative protective material to the substrate without removing the protective coating 34 in the same manner as described above.

In accordance with another preferred embodiment of the present invention, a method of making an automotive grille is provided. A substrate is formed having a first and a second side and dimensions adapted to be mounted to the front of a vehicle. The substrate may be formed by welding different elements or portions of the substrate together, wherein each of the elements may be molded or machined. Alternatively, the substrate may be molded or machined as a single element. The substrate includes a plurality of decorative members 30 defining a plurality of exposed surfaces and a plurality of front faces positioned adjacent the first side of the substrate. A plurality of mounting structures 50 are attached to the substrate on a second side opposite the first side, wherein the plurality of mounting structures 50 are adapted to secure the substrate to the vehicle. In certain preferred embodiments, the mounting structures 50 may be formed integrally with the substrate or may be attached to the substrate by welding. The exposed surfaces and the front faces of the substrate are coated with a coating material 34 to inhibit oxidation of the substrate. The coating material may be a powder coating, and more preferably a black satin powder coating. A plurality of decorative weather resistant members 36, dimensioned to match the plurality of front faces of the plurality of decorative members 30 of the substrate, are adhered to the plurality of front faces to substantially cover the plurality of front faces to further inhibit oxidation of the plurality of faces of the substrate. The decorative weather resistant members are preferably adhered using an epoxy or similar adhesive substance 38.

The advantages of the automotive grille of the preferred embodiments of the present invention having a plurality of decorative weather resistant members adhered to the coated decorative members of the structure are reduction of the problem of moisture getting under the powder coating because there is no removal of the powder coat on the front edge of the structure. Moreover, stainless steel is less prone to tarnishing thereby resulting in a decorative grille having a desirable appearance for a longer period of time.

Disclosed below are additional embodiments for affixing the decorative weather resistant members 36 to the decorative members 30. FIGS. 12 and 13A–D illustrate cut-away sections of the grille 20 wherein the front faces of the decorative members 30 include a channel into which at least a portion of the resistive members 36 are configured to be inserted thereby providing an alternative means for securing the resistive members 36 to the decorative members 30.

Figure 12:
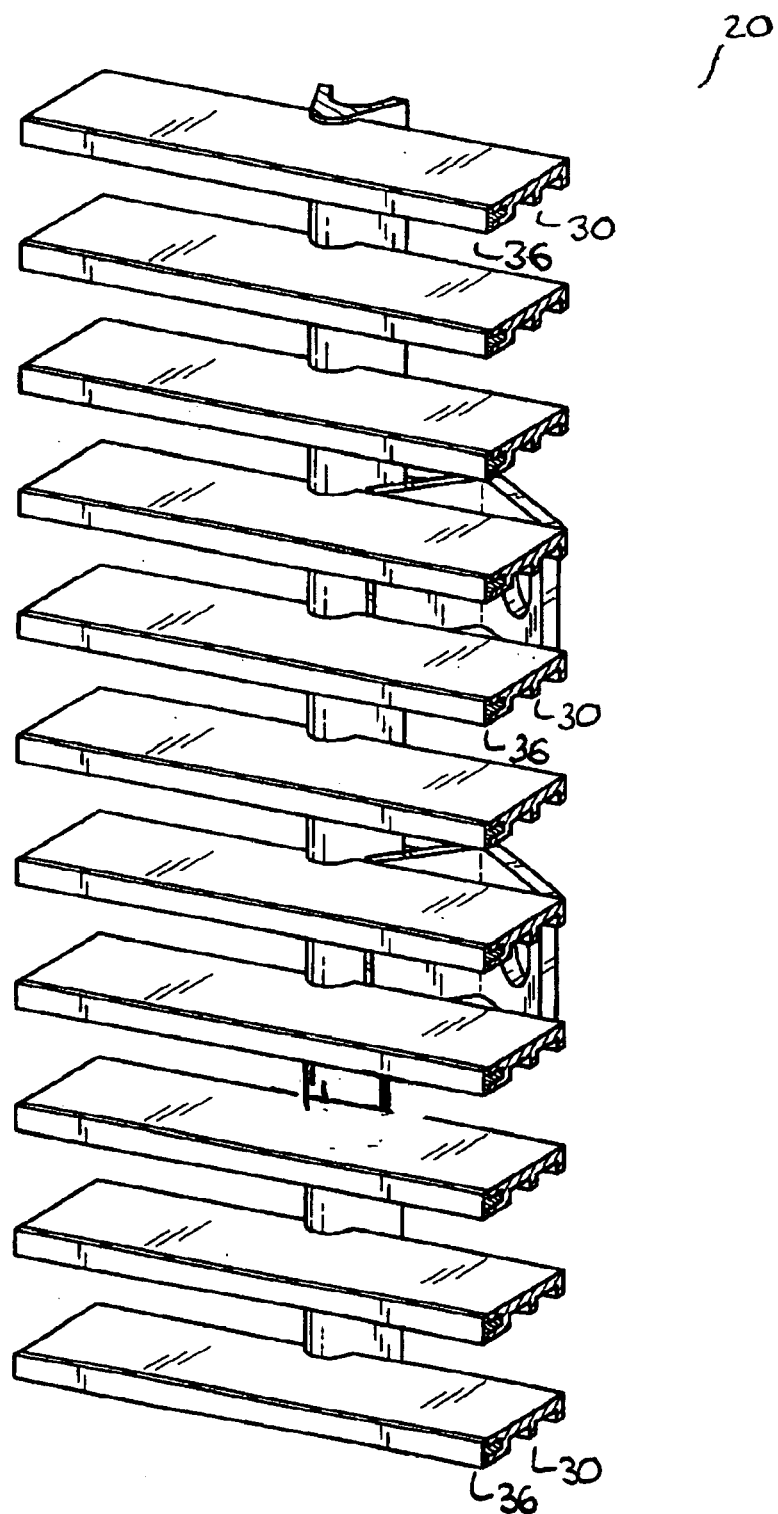
FIG. 12 is a perspective view of a cutaway section of the automotive grille of FIG. 1 incorporating a channel securing assembly.

A cut-away section of the grille 20 is shown in FIG. 12 illustrating the aforementioned configuration for securing the resistive member 36 to the decorative members 30 the grille 20. As previously described, the structure includes a plurality of horizontally extending slats which form the decorative members 30 of the grille. The decorative members 30 include a plurality of exposed surfaces and a plurality of front faces adjacent to the first side of the structure.

The decorative members 30 are shown in detail in FIGS. 13A–D. An exemplary configuration for securing the resistive members 36 to the decorative members 30 is provided in the cross-sectional view of FIG. 13A. Here, a channel 110 is formed in the front face 115 of the decorative member 30 and sized so as to receive a complimentary guide portion 120 of the resistive member 36 which fits within the space formed by the channel 110. In this particular configuration, the channel 110 comprises a generally rounded shape which is configured to receive a complimentary rounded guide portion 120 of the resistive member 36. The channel 110 may further be configured to securely and relatively snuggly receive the complimentary guide portion 120 of the resistive member 36 such that friction alone may be sufficient to maintain the resistive member 36 in position.

In one aspect, providing a channel 110 and guide portion 120 in the manner described facilitates securing the resistive member 36 to the decorative member 30 while avoiding the need to remove the coating material thereby reducing the risk of flaking off of the coating material or rusting. Additionally, glue may be used to secure the resistive member to the decorative member 30 as previously described; however, this may not necessarily be required and can be determined on the basis of the relative fit between the channel 110 of the decorative member 30 and the guide portion 120 of the resistive member 36.

The resistive member 36 further comprises a front facing portion 130 formed in a desired manner that may have various shapes, sizes and configurations. The front facing portion 130 is secured to the decorative member 30 by joining with a suitably shaped complimentary guide portion 120 which is received by the channel 110 of the decorative member 30. As will be appreciated by one of skill in the art, the size and shape of the guide portion 120 and the front facing portion 130 of the resistive member 36 can be configured in a number of different ways thereby providing a substantial degree of flexibility in determining the configuration and appearance of the grille 20. In one aspect, the front facing portion 130 of the resistive member 36 may be configured with a selected shape or size to stylize the appearance of the grille 20 while at the same time conferring the protective and environmentally resistive benefits of having the resistive member 36 attached to the decorative member 30. Additionally, the manner of securing the resistive member 36 to the decorative member 30 is such that it may not be necessary to require the resistive member 36 to follow the contour and shape of the front face of the decorative member 30 as might be required when adhering the resistive member to the decorative member 30 using glue. Thus as shown in FIG. 13A, one configuration for the components of the grille 20 may include the resistive member 36 having a generally flat front facing portion 130 with a generally rounded complimentary guide portion 120.

Figure 13D:
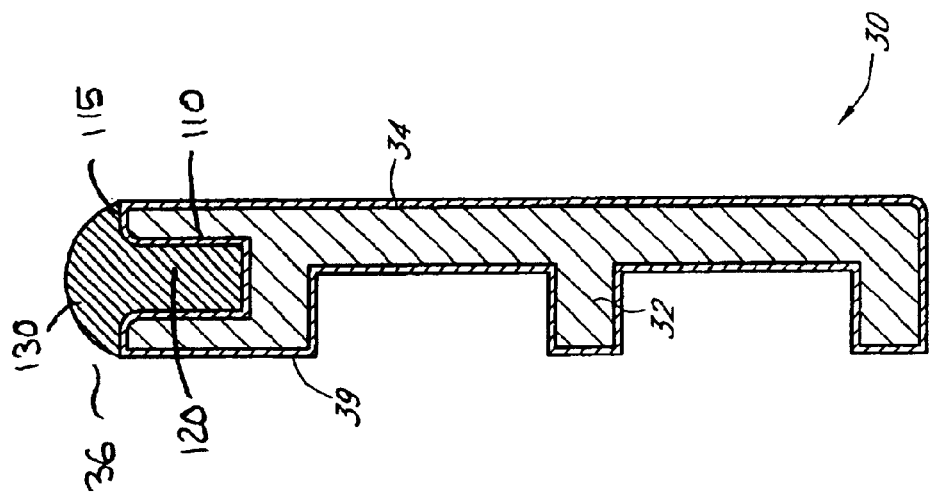
Figure 13C:
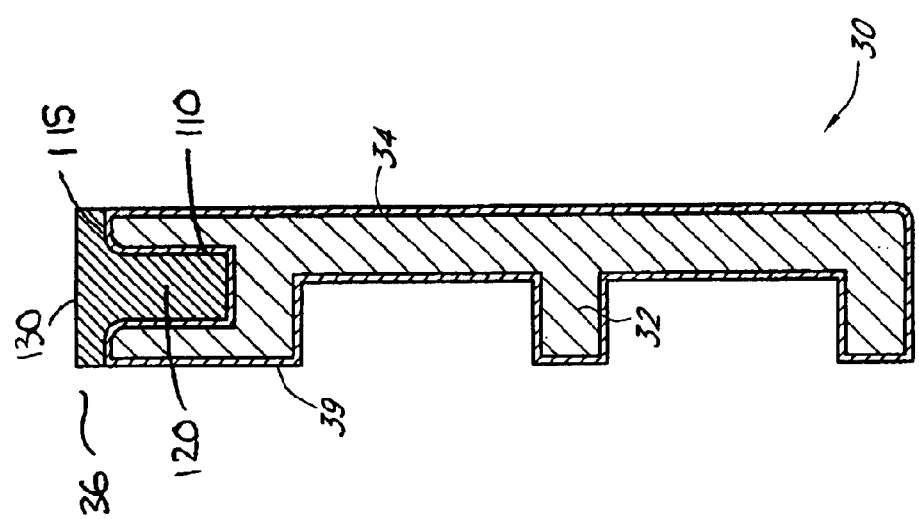

FIG. 13B illustrates a further configuration for the components of the grille 20 wherein the resistive member 36 comprises a generally rounded front facing portion 130 with a generally rounded complimentary guide portion 120. FIG. 13C illustrates another configuration for the components of the grille 20 wherein the resistive member 36 comprises a generally flat front facing portion 130 with a generally rectangular or square complimentary guide portion 120. FIG. 13D illustrates still another configuration for the components of the grille 20 wherein the resistive member 36 comprises a generally rounded front facing portion 130 with a generally rectangular or square complimentary guide portion 120.

Figure 14:
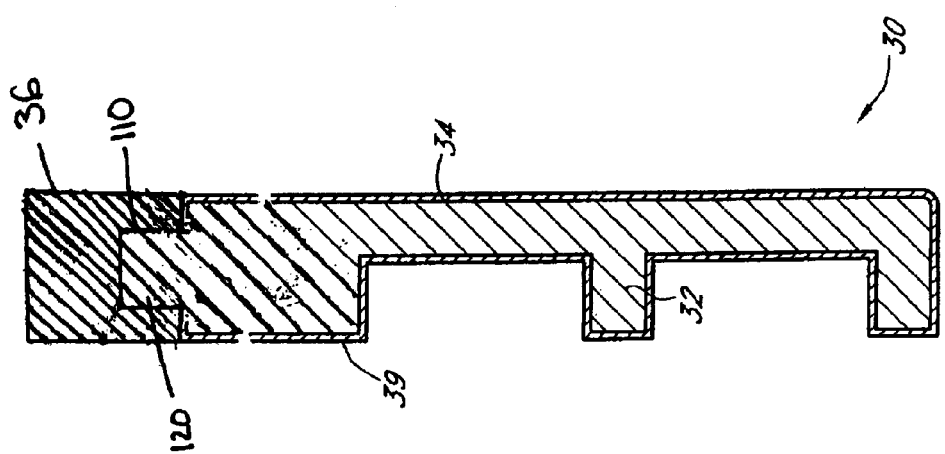
FIG. 14 is a detailed cross sectional view of another embodiment of the automotive grille showing the channel securing assembly of FIG. 12.

It will be appreciated that the aforementioned configurations for securing the resistive members 36 to the decorative members 30 represent but some of many possible configurations for the grille components and, as such, other additional configurations are conceived to be other embodiments of the present teachings. For example, the channel 110 disclosed as being formed within the decorative member 30 and the complimentary guide portion 120 as being formed in association with the resistive member 36 may be modified as shown in FIG. 14 being a reverse connection configuration. In the reverse configuration, the channel 110 may be formed within the resistive member 36 and the complimentary guide portion 120 may be formed in association with the decorative member 30. Securing of the resistive member 36 to the decorative member 30 may proceed in the manners disclosed above including friction fitting and/or gluing. Additionally, various different shapes and sizes of resistive members 36, channels 110, and guides 120 may be devised as previously described above.

Additionally, the channel and guide securing means may be alternatively represented by a pin and receiving hole configuration. In this configuration, the channel may comprise a plurality of receiving holes formed on either the resistive member or the decorative member with a plurality of complimentary pins formed on the opposing component such that the two may be joined and secured to one another.

As previously described, the decorative member 30 may be secured to the resistive member 36 via a friction fitting approach or through the use of glue or other adhesive. In one aspect, the coating used in connection with the decorative member 30 may be partially removed, polished, or prepped in a manner so as to improve the bonding between the decorative member 30 and the resistive member 36. Preparation of the decorative member 30 is generally conducted in such a way so as to avoid exposing portions of the decorative member 30 to the elements without the benefit of protection afforded by the coating or the resistive member 36. Prepared in this manner, chipping, wearing, or rusting of the coating or the decorative member 30 is desirably avoided improving the durability of the grille 20.

Figure 15:
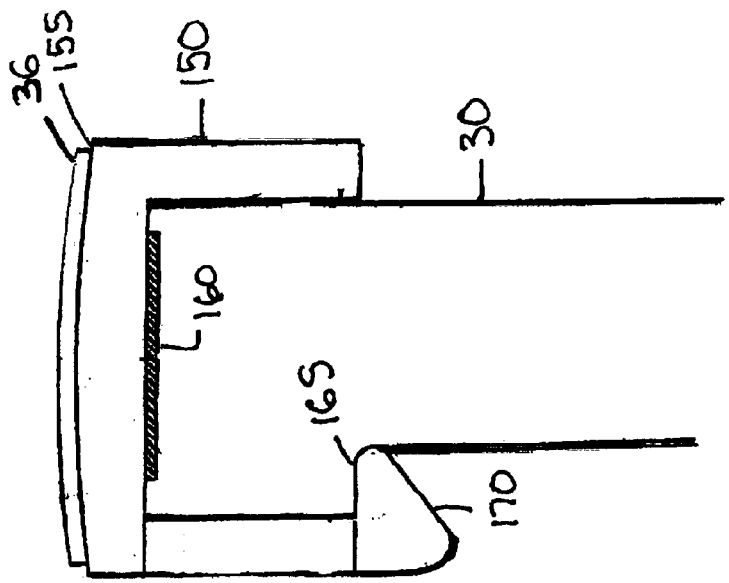
FIG. 15 is a detailed cross sectional view of another embodiment of the automotive grille.

In a still further embodiment, shown in FIG. 15, the resistive member 36 may be secured to the decorative member 30 using a cap structure 150. The cap 150 may be formed with a front face 155 to which the resistive member 36 is attached (e.g. gluing, welding, molding, etc.) The cap 150 may be positioned about the decorative member 30 with an adhesive portion 160 positioned therebetween to better secure the cap 150 to the decorative member 30. Additionally, the decorative member 30 may include a ridged portion or protrusion 165 that engages with a flange portion 170 of the cap 150. In this configuration, the flange 170 of the cap may be "snapped" or guided into position about the ridged portion 165 to secure the cap 150 in a desired position and or orientation. Securing of the cap 150 to the ridged portion 165 may be augmented by the use of the adhesive layer 160 to provide a secure means for positioning the resistive member 36. As will be appreciated by one of skill in the art, the cap 150 may be fabricated from various materials including for example: plastic, metal, rubber, etc.

In one aspect, the cap 150 is a component of the resistive member 36 and comprises a U-shaped cross section with a base section and two arms with an engagement surface comprising the flange 170 that is formed on one of the arms and extends in a direction having a component substantially parallel to the base section so as to engage with the ridge 165 formed on the decorative member 30.

While a number of preferred embodiments of the invention and variations thereof have been described in detail, other modifications and methods of making the automotive grille will be apparent to those of skill in the art. Accordingly, it should be understood that various applications, modifications, and substitutions may be made of equivalents without departing from the spirit of the invention or the scope of the claims.

What is claimed is:

1. An automotive grille comprising:
   a substrate having a first and second side and dimensions adapted to be mounted to the front of a vehicle, wherein the substrate includes a plurality of decorative members defining a plurality of exposed surfaces and a plurality of front faces having at least one channel formed therein positioned adjacent the first side of the substrate;

a plurality of mounting structures attached to the substrate on a second side opposite the first side, wherein the plurality of mounting structures are adapted to secure the substrate to the vehicle; and at least one decorative weather resistant member having at least one guide complementarily dimensioned to the at least one channel formed in the front faces of the plurality of decorative members of the substrate wherein the at least one decorative weather resistant member is secured to the at least one front face to substantially cover the at least one front face to further inhibit oxidation of the at least one front face of the substrate.

2. The grille of claim 1, wherein the substrate is formed of aluminum and the at least one decorative weather resistant member is formed of stainless steel.

3. The grille of claim 1, wherein the at least one decorative weather resistant member is secured to the at least one front face by friction fitting of the at least one guide within the at least one channel.

4. The grille of claim 1, wherein the channel defines a hole and the guide defines a pin, the pin configured to be secured within the hole defined by the channel to thereby secure the decorative weather resistant member to the decorative member.

5. The grille of claim 4, wherein the channel defines a plurality of holes and the guide defines a plurality pins configured to complementarily join the decorative weather resistant member to the decorative member.

6. The grille of claim 1, wherein the at least one decorative weather resistant member is secured to the at least one front face by adhering the at least one guide within the at least one channel.

7. The grille of claim 6, wherein epoxy is used to adhere the at least one guide within the at least one channel.

8. The grille of claim 1, wherein the front face of the decorative member is a horizontally extending elongate member.

9. The grille of claim 1, wherein the at least one decorative member comprises a plurality of decorative members.

10. The grille of claim 1, wherein the at least one decorative weather resistant member comprises a plurality of decorative weather resistant members.

11. The grille of claim 1, wherein the at least one decorative weather resistant member comprises a plurality of metallic strips.

12. grille of claim 1, wherein the exposed surfaces and the front faces are substantially coated with a coating material to inhibit oxidation of the substrate.

13. The grille of claim 12, wherein the coating material comprises a powder coat material.

14. The grille of claim 12, wherein the coating material in the region of the channel is prepped prior to introducing the guide within the channel.

15. The grille of claim 14, wherein the coating material in the region of the channel is polished, sanded, or removed prior to introducing the guide within the channel.

16. The grille of claim 12, wherein the coating material is unaltered when the guide is introduced within the channel.

17. An automotive grill comprising:
a substrate having a first and a second side wherein the substrate has a plurality of mounting structures that mount the first side of the substrate to the vehicle and wherein the substrate further includes a plurality of decorative members that extend at least in part across the front of the vehicle when the substrate is mounted to the vehicle; the plurality of decorative members further defining a plurality of exposed surfaces with a plurality of resistive members secured to the decorative members along at least one of the exposed surfaces so as to define an interface therebetween wherein the plurality of resistive members and the plurality of decorative members collectively define a channel and a guide that interconnect the plurality of resistive members and the plurality of decorative members that engage with each other so as to secure the plurality of resistive members to the plurality of decorative members.

18. The grill of claim 17, wherein the channel is formed in the resistive member and the guide is formed in the decorative member.

19. The grill of claim 17, wherein the channel is formed in the decorative member and the guide is formed in the resistive member.

20. The grill of claim 17, wherein the decorative members are secured to the resistive members by friction fitting of the guide within the channel.

21. The grill of claim 17, wherein the channel defines a hole and the guide defines a pin, the pin configured to be secured within the hole defined by the channel to thereby secure the decorative member to the resistive member.

22. The grill of claim 17, wherein the exposed surfaces of the decorative structures adjacent the interface are coated with a coating material to inhibit oxidation of the substrate.

23. The of claim 22, wherein the coating material in the region of the channel is polished, sanded, or removed prior to introducing the guide within the channel.

24. The grill of claim 22, wherein the coating material is unaltered when the guide is introduced within the channel.

25. A method of forming a grill component of an automobile, the method comprising:
forming a substrate of the grill so as to be dimensioned to be interconnected to the front of a vehicle and so as to have a plurality of decorative members; and
interconnecting a resistive member to the decorative members by positioning a channel formed in the decorative member about a protrusion formed in the resistive members.

26. The method of claim 25 wherein, the decorative members are formed to have a hardened outer surface.

27. The method of claim 25 wherein, epoxy is interposed between the protrusion of the resistive members and the channel of the decorative members to adhere the plurality of decorative members to the resistive members.

28. The method of claim 25, wherein exposed surfaces of the decorative members are coated with a coating material to inhibit oxidation.

29. The method of claim 28 wherein, the coating material comprises a powder coating.

* * * * *

UNITED STATES PATENT AND TRADEMARK OFFICE
CERTIFICATE OF CORRECTION

PATENT NO. : 6,957,837 B2  Page 1 of 1
DATED : October 25, 2005
INVENTOR(S) : William S. Stull It is certified that error appears in the above-identified patent and that said Letters Patent is hereby corrected as shown below:

<u>Column 9,</u>
Line 48, after "12." insert -- The --.

<u>Column 10,</u>
Line 34, after "The" insert -- grill --.
Lines 48 and 50, delete "claim 25 wherein," insert -- claim 25, wherein --.
Line 57, delete "claim 28 wherein," insert -- claim 28, wherein --.

Signed and Sealed this

Sixth Day of June, 2006

JON W. DUDAS
*Director of the United States Patent and Trademark Office*